United States Patent
Binkholder et al.

(10) Patent No.: US 10,538,330 B2
(45) Date of Patent: Jan. 21, 2020

(54) STORE EJECTION SYSTEM AND METHOD OF DISCHARGING A STORE FROM A VEHICLE

(71) Applicant: THE BOEING COMPANY, Chicago, IL (US)

(72) Inventors: Ryan Binkholder, Webster Groves, MO (US); John K. Foster, St. Peters, MO (US)

(73) Assignee: The Boeing Company, Chicago, IL (US)

(*) Notice: Subject to any disclaimer, the term of this patent is extended or adjusted under 35 U.S.C. 154(b) by 219 days.

(21) Appl. No.: 15/718,765

(22) Filed: Sep. 28, 2017

(65) Prior Publication Data

US 2019/0092467 A1    Mar. 28, 2019

(51) Int. Cl.
*B64D 1/02*    (2006.01)

(52) U.S. Cl.
CPC .................... *B64D 1/02* (2013.01)

(58) Field of Classification Search
CPC ... B64D 1/02; B64D 1/12; B64D 1/06; B64D 1/04
USPC ................... 244/137.4; 294/82.26
See application file for complete search history.

(56) References Cited

U.S. PATENT DOCUMENTS

| | | | | |
|---|---|---|---|---|
| 1,500,973 A * | 7/1924 | Wearham | ................. | B64D 1/02 294/82.26 |
| 3,557,550 A * | 1/1971 | Legarra | ................... | B64D 1/06 60/637 |
| 4,050,656 A * | 9/1977 | Peterson | .................. | B64D 1/06 244/137.4 |
| 4,183,480 A * | 1/1980 | Jakubowski, Jr. | ....... | B64D 1/02 244/137.4 |
| 4,313,582 A * | 2/1982 | Hasquenoph | ............ | B64D 7/08 244/137.4 |
| 4,318,561 A * | 3/1982 | Hasquenoph | ............ | B64D 7/08 244/137.4 |
| 4,399,968 A * | 8/1983 | Stock | ....................... | B64D 7/08 244/137.4 |
| 4,669,356 A * | 6/1987 | Griffin | ..................... | B64D 1/04 244/137.4 |
| 5,583,312 A * | 12/1996 | Jakubowski, Jr. | ....... | B64D 1/06 244/137.4 |
| 6,347,768 B1 | 2/2002 | Jakubowski et al. | | |
| 6,663,049 B1 | 12/2003 | Jakubowski et al. | | |
| 6,676,083 B1 | 1/2004 | Foster et al. | | |
| 6,811,123 B1 | 11/2004 | Foster et al. | | |
| 7,147,188 B2 | 12/2006 | Jakubowski et al. | | |
| 7,648,104 B1 * | 1/2010 | Jakubowski, Jr. | ....... | B64D 1/04 244/137.4 |

(Continued)

*Primary Examiner* — Claude J Brown
(74) *Attorney, Agent, or Firm* — Armstrong Teasdale LLP

(57) ABSTRACT

A store ejector rack including a first hook member and a second hook member, a split sleeve guide member, and a pair of split sleeve members, including a first split sleeve member and a second split sleeve member, operatively coupled to the split sleeve guide member. The first split sleeve member is coupled to the first hook member and the second split sleeve member is coupled to the second hook member. A valve control assembly is operatively coupled to the split sleeve guide member, wherein actuation of the split sleeve guide member causes actuation of the first hook member, the second hook member, and the valve control assembly.

20 Claims, 7 Drawing Sheets

(56) References Cited

U.S. PATENT DOCUMENTS

| | | | |
|---|---|---|---|
| 7,861,976 B2* | 1/2011 | Holemans | B63B 21/08 244/119 |
| 8,608,111 B2 | 12/2013 | McMahon | |
| 8,869,671 B2 | 10/2014 | Williamson et al. | |
| 8,899,525 B2 | 12/2014 | Tobias et al. | |
| 9,021,932 B2 | 5/2015 | Tobias et al. | |
| 9,090,347 B2 | 7/2015 | Tobias et al. | |
| 9,505,495 B2 | 11/2016 | Tobias et al. | |
| 2004/0016849 A1* | 1/2004 | Jakubowski, Jr. | B64D 1/02 244/137.4 |
| 2004/0094672 A1* | 5/2004 | Jakubowski, Jr. | B64D 1/06 244/137.4 |
| 2004/0108415 A1* | 6/2004 | Foster | B64D 1/06 244/137.1 |
| 2006/0108478 A1* | 5/2006 | Bajuyo | B64D 1/04 244/137.4 |

* cited by examiner

STORE EJECTION SYSTEM AND METHOD OF DISCHARGING A STORE FROM A VEHICLE

BACKGROUND

The field of the present disclosure relates generally to a store ejection system and, more specifically, to a system and method for discharging a store from a vehicle using a store ejection rack having a split sleeve hook opening and isolation valve actuation configuration.

In the aeronautical industry, for example, a "store" refers generally to any of a number of munitions or other materials that can be discharged from an aircraft. For example, military aircraft can include a store ejection system for use in discharging bombs, missiles, rockets, other types of munitions, and non-munitions stores such as electronic equipment. Typically, a store ejection system includes one or more racks located beneath the wings or fuselage of the aircraft. The racks hold the stores and release the stores upon a command.

In at least one known store ejection system, the stores are connected to the racks by one or more mechanical hooks. The store ejection system includes a release mechanism for actuating the hooks to release the stores, and a jettison mechanism for forcibly ejecting the stores away from the aircraft. The release and jettison mechanisms are actuated by a pressure-actuator, such as a ram that is actuated by a pressure increase in a cylinder. The pressure can be provided by a pyrotechnic cartridge, i.e., an explosive, or by a source of non-pyrotechnic pressurized gas. The flow of pressurized gas from the pressure vessel is typically controlled by an isolation valve. In the closed position, the isolation valve restricts the flow of the pressurized gas to an accumulator, and the isolation valve can be closed to restrict fluid from flowing to the accumulator from which a store is presently being released or from which the store has already been released.

While the conventional systems have proven effective for controlling the discharge of stores, a need continues to exist for improvements in the physical characteristics and operational aspects of store ejection systems.

BRIEF DESCRIPTION

In one aspect, a store ejector rack is provided. The rack includes a first hook member and a second hook member, a split sleeve guide member, and a pair of split sleeve members, including a first split sleeve member and a second split sleeve member, operatively coupled to the split sleeve guide member. The first split sleeve member is coupled to the first hook member and the second split sleeve member is coupled to the second hook member. A valve control assembly is operatively coupled to the split sleeve guide member, wherein actuation of the split sleeve guide member causes actuation of the first hook member, the second hook member, and the valve control assembly.

In another aspect, a store ejection system is provided. The system includes a fluid source and an actuation system including an accumulator in selective fluid communication with the fluid source and a poppet valve configured to control a flow of fluid channeled from the accumulator. The system further includes a split sleeve guide member actuatable by the poppet valve and a pair of split sleeve members, including a first split sleeve member and a second split sleeve member, operatively coupled to the split sleeve guide member. The pair of split sleeve members are positioned about the split sleeve guide member such that a gap is defined therebetween. An isolation valve is configured to control a flow of fluid channeled from the fluid source to the accumulator, and a valve control assembly is operatively coupled to the isolation valve, and operatively coupled to the split sleeve guide member through said gap. Actuation of the split sleeve guide member causes actuation of the valve control assembly and the isolation valve.

In yet another aspect, a method of discharging a store from a vehicle is provided. The method includes releasably retaining a store within a store ejector rack with a first hook member and a second hook member, providing fluid from a fluid source to an accumulator via an isolation valve, actuating a poppet valve in flow communication with the accumulator, and actuating a split sleeve guide member based on actuation of the poppet valve. The split sleeve guide member has a pair of split sleeve members, including a first split sleeve member and a second split sleeve member, operatively coupled thereto, and the pair of split sleeve members are positioned about the split sleeve guide member such that a gap is defined therebetween. The method further includes actuating a valve control assembly based on actuation of the split sleeve guide member. The valve control assembly is operatively coupled to the split sleeve guide member through the gap, and is operatively coupled to the isolation valve such that actuation of the split sleeve guide member causes actuation of the isolation valve.

DETAILED DESCRIPTION

The implementations described herein relate to a system and method for discharging a store from a vehicle using a store ejector rack having a split sleeve hook opening and isolation valve actuation configuration. More specifically, the system described herein includes a hook member assembly, including a first hook member and a second hook member, for use in releasably retaining a store within a store ejector rack, and a store release mechanism for use in simultaneously releasing the store and isolating the ejector rack station from further pressurization. In this regard, the system includes a pair of split sleeve members that facilitate actuation of the first hook member and the second hook member for release of the store when actuated by a pressurized poppet valve. For example, the split sleeve members are dependently translatable with each other when actuated to release the store, and are independently translatable relative to each other when loading the store into the rack.

In addition, the split sleeve members are driven by a guide member that also facilitates actuating an isolation valve when actuating the split sleeve members. As such, the configuration described herein provides a simplified and less costly store ejector system.

The term "store" is used herein to refer generally to any of a number of munitions or other materials that can be dispensed from an aircraft or other vehicle or structure. A store may include, but is not limited to, bombs, missiles, rockets, other types of munitions, and non-munitions stores such as electronic equipment.

As used herein, an element or step recited in the singular and proceeded with the word "a" or "an" should be understood as not excluding plural elements or steps, unless such exclusion is explicitly recited. Furthermore, references to "exemplary implementation" or "one implementation" of the present disclosure are not intended to be interpreted as excluding the existence of additional implementations that also incorporate the recited features.

Figure 1:
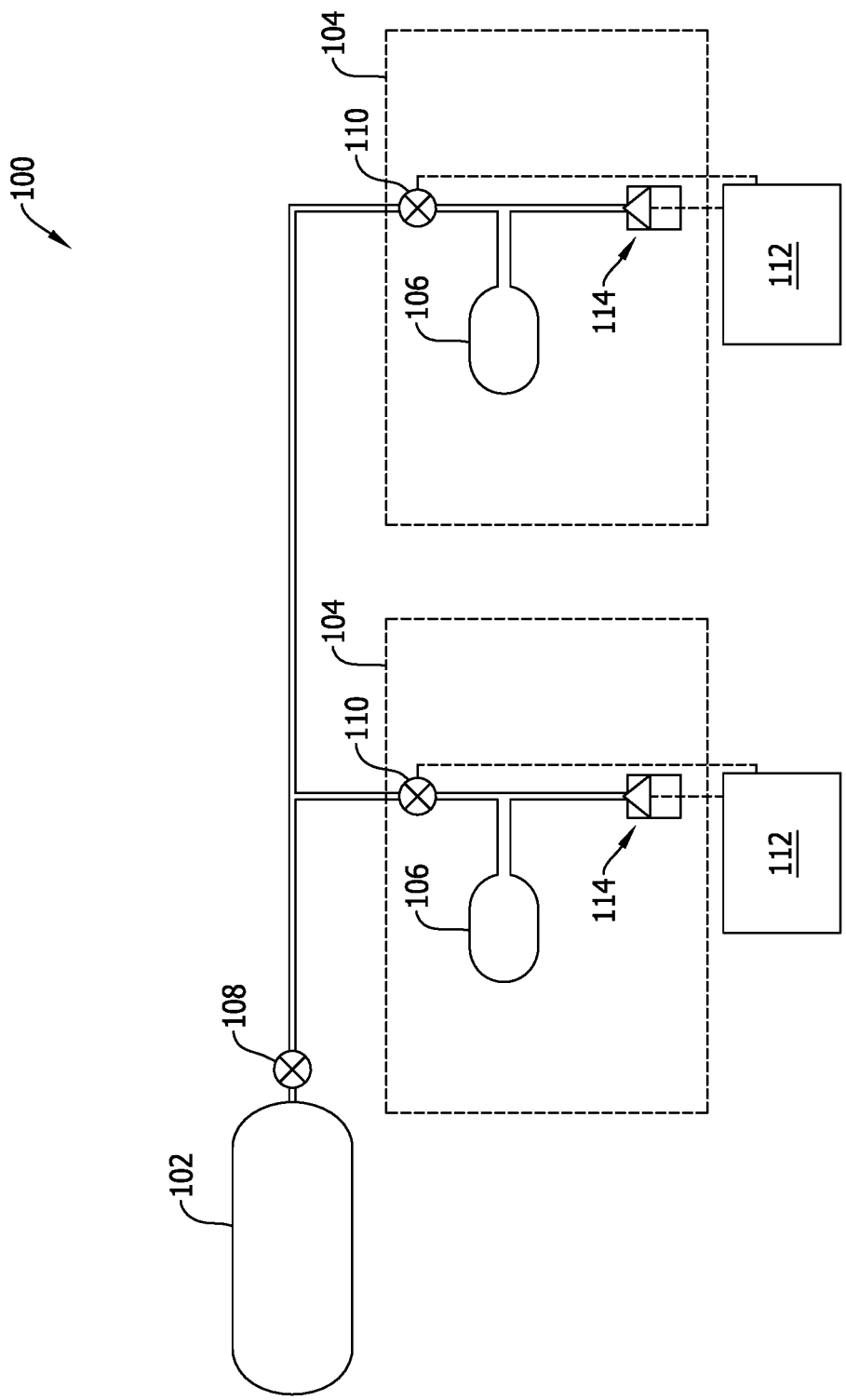
FIG. 1 is a schematic illustration of an exemplary store ejection system.

FIG. 1 is a schematic illustration of an exemplary store ejection system 100. In the exemplary implementation, store ejection system 100 includes a fluid source 102 and a pair of actuation systems 104. Each actuation system 104 is operable for discharging a respective store (not shown) from store ejection system 100. Fluid source 102 is a source of compressed non-pyrotechnic fluid that provides the source of energy and the transfer mechanism for store ejection system 100, as will be explained in further detail below. Example fluids that may be stored in fluid source 102 include, but are not limited to, air, nitrogen, helium, and argon.

In one implementation, each actuation system 104 includes an accumulator 106 in selective fluid communication with fluid source 102. For example, store ejection system 100 includes an outlet valve 108 positioned downstream from fluid source 102, and each actuation system 104 has an isolation valve 110 positioned between fluid source 102 and accumulator 106. Outlet valve 108 controls the flow of fluid discharged from fluid source 102, and each isolation valve 110 controls the flow of fluid channeled from fluid source 102 to each respective accumulator 106. While shown as including two actuation systems 104, store ejection system 100 may include any number of actuation systems 104 that enables store ejection system 100 to function as described herein.

Store ejection system 100 further includes a store release mechanism 112. In the exemplary embodiment, each actuation system 104 includes a poppet valve 114 that controls a flow of fluid channeled from accumulator 106. As will be explained in further detail below, store release mechanism 112 is operatively coupled to and selectively actuatable by poppet valve 114. In addition, as will be explained in further detail below, store release mechanism 112 is operatively coupled to isolation valve 110.

Figure 2:
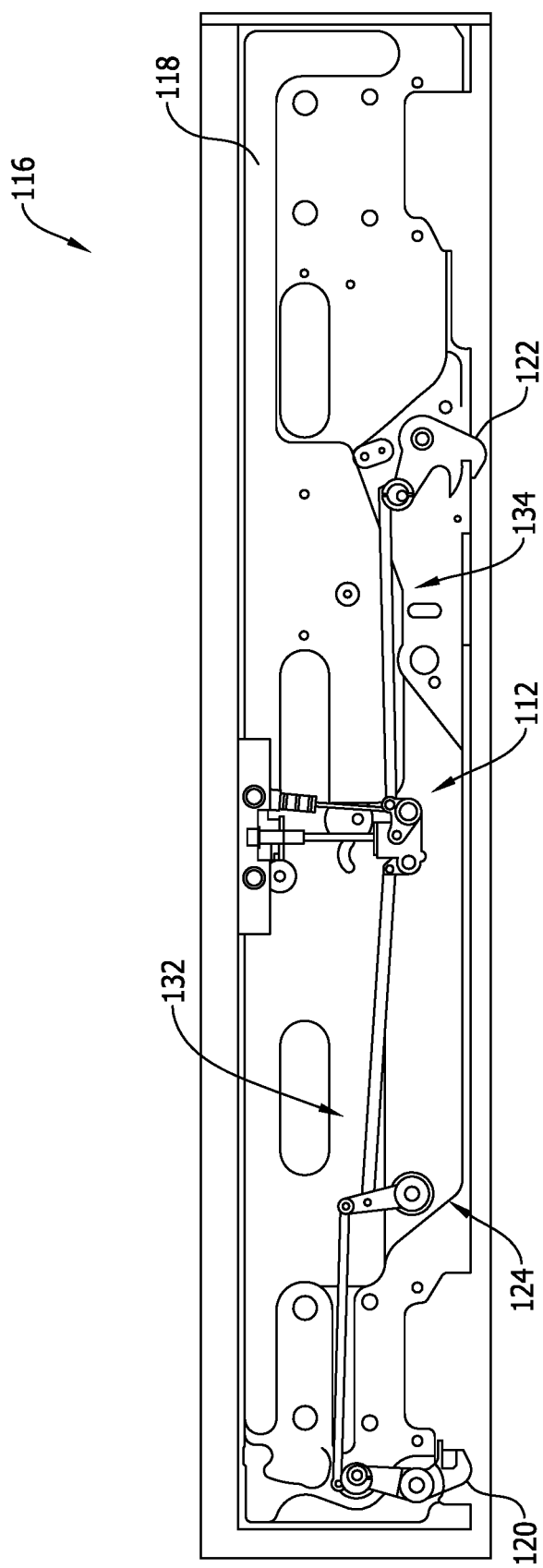
FIG. 2 is an internal side view of an exemplary store ejection rack that may use the store ejection system shown in FIG. 1.
Figure 3:
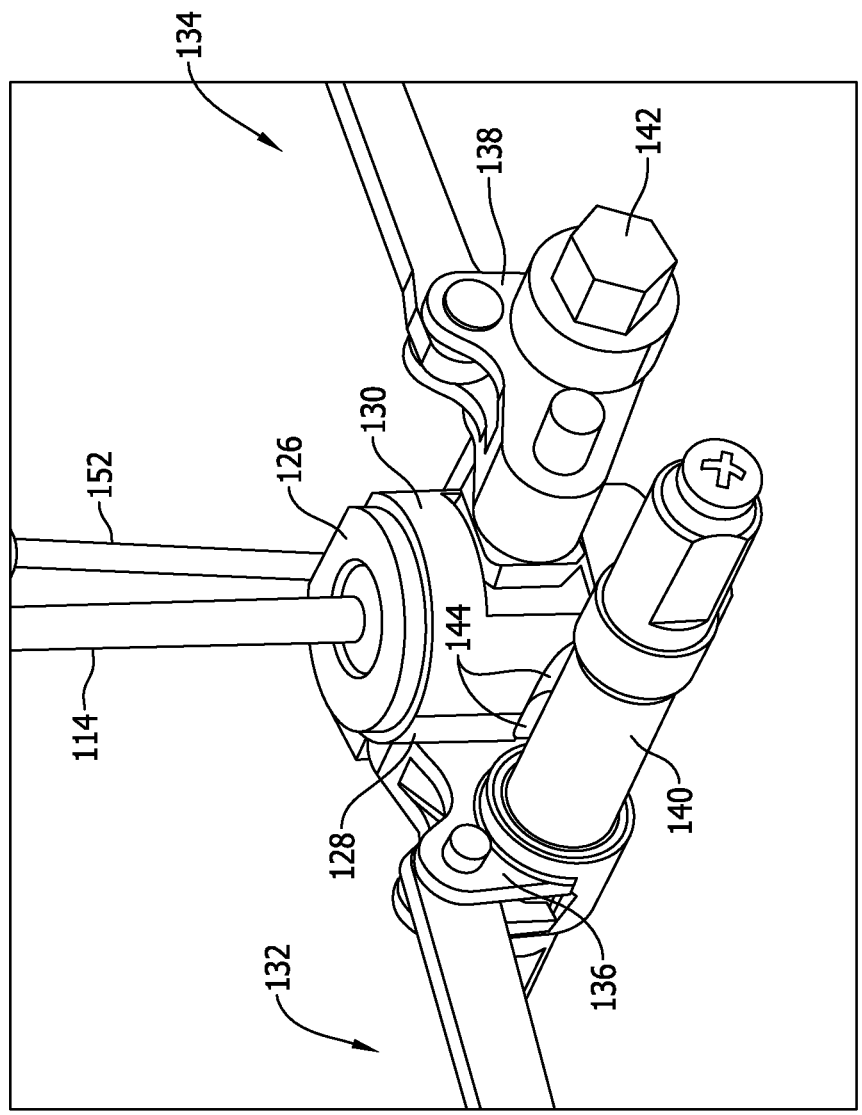
FIG. 3 is an enlarged perspective view of a portion of the store ejector rack shown in FIG. 2.
Figure 4:
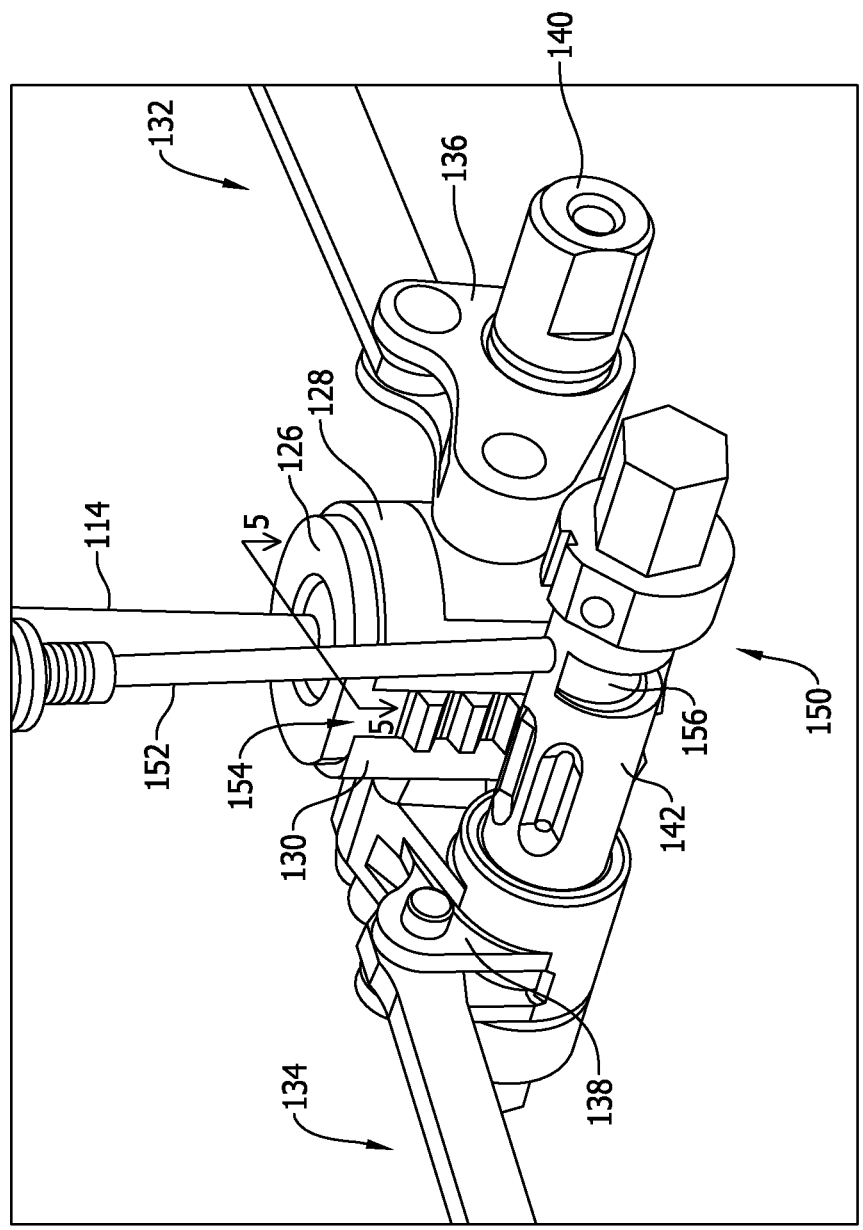
FIG. 4 is an alternative enlarged perspective view of the portion of the store ejector rack shown in FIG. 3.

FIG. 2 is an internal side view of an exemplary store ejector rack 116 that may use store ejection system 100 (shown in FIG. 1), FIG. 3 is an enlarged perspective view of a portion of store ejector rack 116, and FIG. 4 is an alternative enlarged perspective view of the portion of store ejector rack 116. In the exemplary implementation, store ejector rack 116 includes a rack housing 118 and a plurality of components assembled therein. More specifically, store ejector rack 116 includes a first hook member 120 and a second hook member 122 that releasably retain a store within store ejector rack 116. Store ejector rack 116 also includes store release mechanism 112 and a linkage assembly 124 coupled between store release mechanism 112 and first hook member 120 and second hook member 122.

Referring to FIG. 3, store release mechanism 112 includes a split sleeve guide member 126 and a pair of split sleeve members, including a first split sleeve member 128 and a second split sleeve member 130, disposed around and operatively coupled to split sleeve guide member 126, wherein the split sleeve guide member 126, first split sleeve member 128, and second split sleeve member 130 are each configured for linear translation along a first axis. Moreover, first split sleeve member 128 is coupled to a first hook linkage actuating a first hook member 120 and second split sleeve member 130 is coupled to a second hook linkage actuating a second hook member 122. More specifically, linkage assembly 124 (shown in FIG. 2) includes a first hook linkage 132 coupled between first hook member 120 and a first drive crank 136 coupled to first split sleeve member 128, and a second hook linkage 134 coupled between second hook member 122 and a second drive crank 138 coupled to second split sleeve member 130. As such, first hook member 120 and second hook member 122 are operatively coupled to store release mechanism 112, and are actuatable by store release mechanism 112 to release a store from store ejector rack 116, as will be explained in further detail below.

In one implementation, a first drive crank 136 is coupled between first hook linkage 132 and first split sleeve member 128, and a second drive crank 138 is coupled between second hook linkage 134 and second split sleeve member 130. Each of first drive crank 136 and second drive crank 138 are rotatable about a fixed pivot point to facilitate transforming linear translation of first split sleeve member 128 and second split sleeve member 130 (along a second axis oriented substantially normal to a first axis) into linear translation of first hook linkage 132 and second hook linkage 134 (along the first axis). In the exemplary implementation, first drive crank 136 is rotatable about a safety shaft 140, and second drive crank 138 is rotatable about a release shaft 142.

Safety shaft 140 is operable to selectively engage the pair of split sleeve members simultaneously, and to restrict actuation of the pair of split sleeve members when engaged therewith. More specifically, first split sleeve member 128 and second split sleeve member 130 each have an indent 144 defined therein and sized to selectively receive a portion of safety shaft 140 therein. Each indent 144 is aligned with each other when store ejector rack 116 is in a first operational position, such as that shown in FIG. 5. In addition, safety shaft 140 includes a first side 146 defined by a cutout and a second side 148 (both shown in FIG. 5).

In operation, safety shaft 140 is rotatable for selectively engaging the pair of split sleeve members simultaneously. For example, when safety shaft 140 is oriented such that first side 146 is aligned with indents 144, the pair of split sleeve members are translatable relative to safety shaft 140. In contrast, when safety shaft 140 is oriented such that second side 148 is aligned with indents 144, the pair of split sleeve members are restricted from translating relative to safety shaft 140. As such, translation of first split sleeve member 128 and second split sleeve member 130 is restricted with the use of a single locking mechanism.

Referring to FIG. 4, store release mechanism 112 further includes a valve control assembly 150 operatively coupled to isolation valve 110 (shown in FIG. 1) and split sleeve guide member 126. Valve control assembly 150 includes release shaft 142 and a valve control member 152 extending between isolation valve 110 and release shaft 142. In the exemplary implementation, the pair of split sleeve members are positioned about split sleeve guide member 126 such that a gap 154 is defined therebetween. As such, split sleeve guide member 126 is operatively coupled to valve control assembly 150 through gap 154.

For example, in one implementation, split sleeve guide member 126 and valve control assembly 150 are operatively coupled together at a geared interface positioned in said gap 154. More specifically, split sleeve guide member 126 includes a rack gear, and release shaft 142 includes a pinion gear operatively engaged with the rack gear. Release shaft 142 further includes a cam surface 156 operatively coupled to valve control member 152.

In operation, actuation of split sleeve guide member 126 induces actuation of isolation valve 110 as a function of rotation of release shaft 142. More specifically, displacement of poppet valve 114 actuates split sleeve guide member 126, which causes release shaft 142 to rotate as a function of the geared interface, which facilitates engagement of cam surface 156 with valve control member 152, thereby inducing translation of valve control member 152 and actuation of isolation valve 110. As will be explained in further detail below, actuation of split sleeve guide member 126 via displacement of poppet valve 114 also causes rotation of the first drive crank 136 and second drive crank 138 that are coupled to the first split sleeve member 128 and second split sleeve member 130. This rotation transforms linear translation of the first and second split sleeve members 128, 130 along the first direction 158 into linear translation of the first hook linkage 132 and second hook linkage 134, which results in the release of a store from store ejector rack 116. As such, actuation of poppet valve 114 facilitates the release of the store and the substantially simultaneous actuation of isolation valve 110, which restricts the flow of fluid from accumulator 106 (shown in FIG. 1) after the store has been released.

Figure 5:
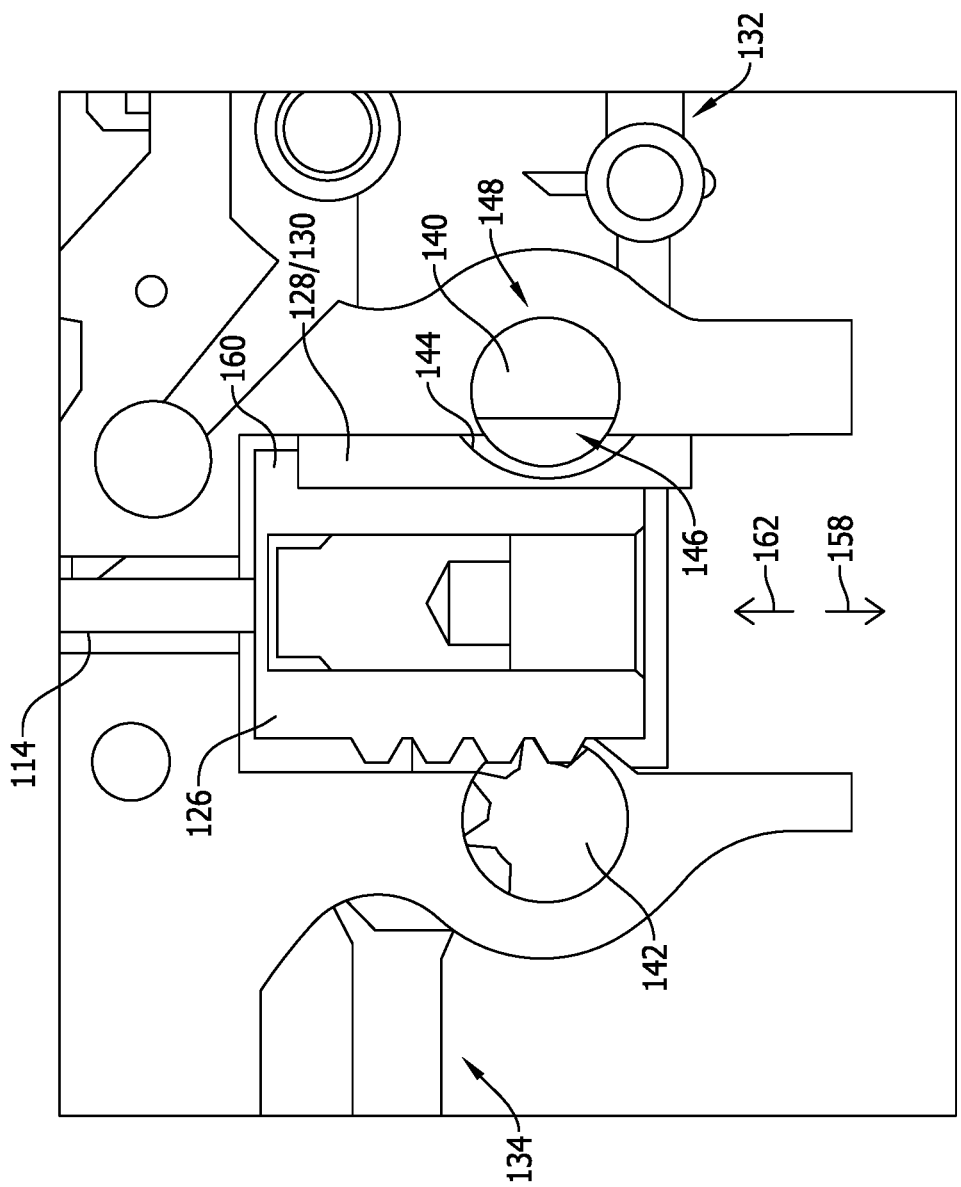
FIG. 5 is a cross-sectional view of the portion of the store ejector rack shown in FIG. 4, and taken along Line 5-5, with the store ejector rack in a first operational position.
Figure 6:
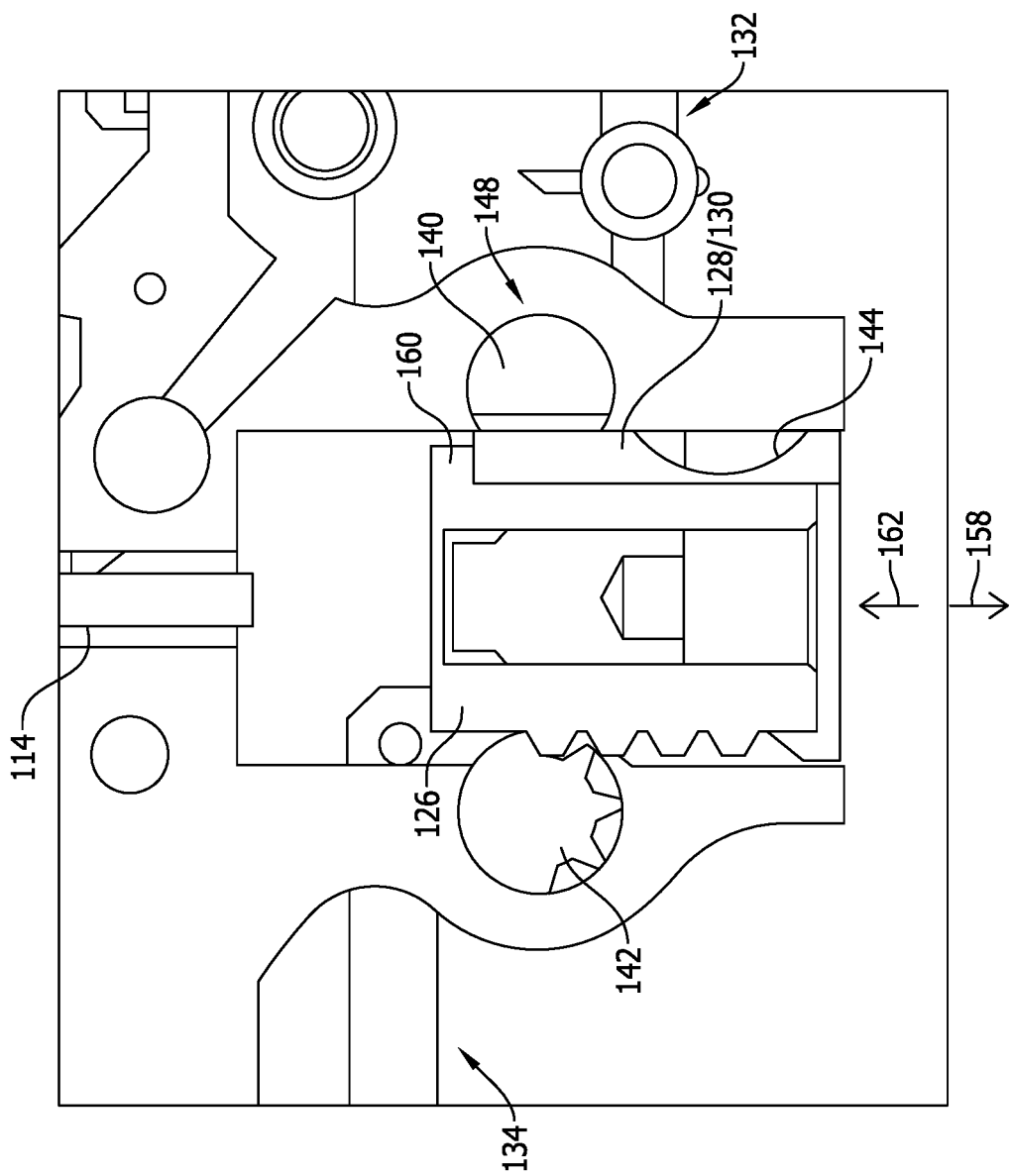
FIG. 6 is a cross-sectional view of the portion of the store ejector rack shown in FIG. 5 with the store ejector rack in a second operational position.
Figure 7:
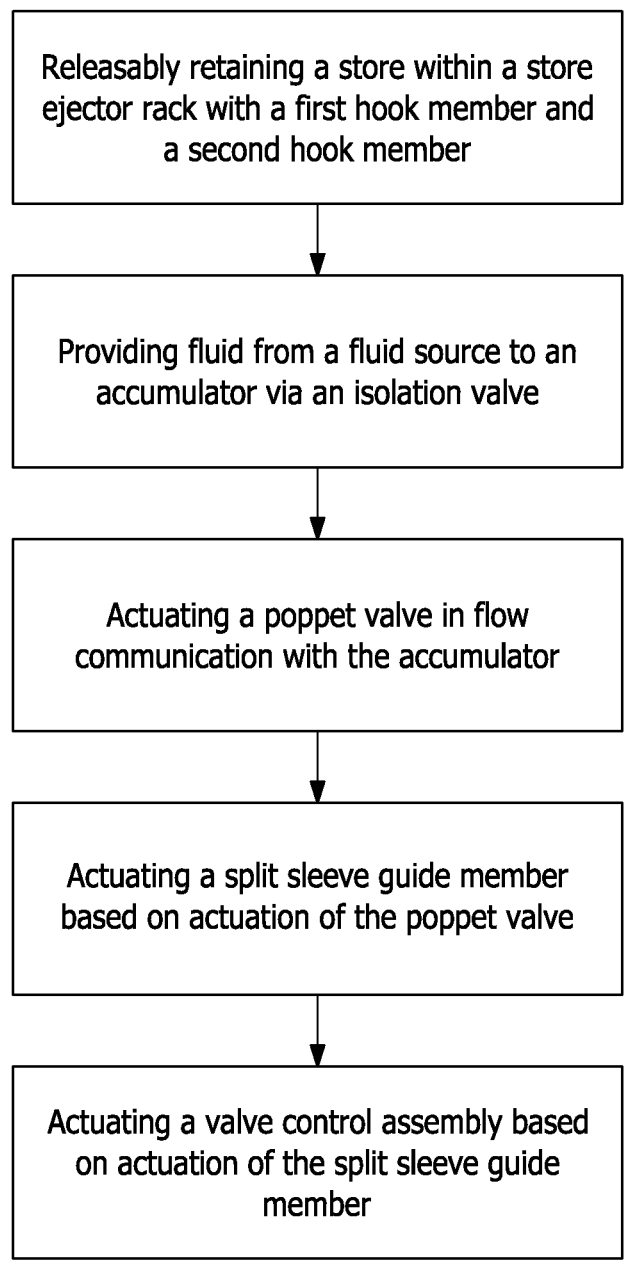
FIG. 7 is a flow diagram illustrating an exemplary method of discharging a store from a vehicle.

FIG. 5 is a cross-sectional view of the portion of store ejector rack 116 shown in FIG. 4, and taken along Line 5-5 (shown in FIG. 4), with store ejector rack 116 in a first operational position, and FIG. 6 is a cross-sectional view of the portion of store ejector rack 116 shown in FIG. 5 with store ejector rack 116 in a second operational position. In the exemplary implementation, split sleeve guide member 126 and the pair of split sleeve members are selectively translatable in a first direction 158 and a second direction 162. For example, split sleeve guide member 126 and the pair of split sleeve members are translatable in first direction 158 when actuated by displacement of poppet valve 114. More specifically, split sleeve guide member 126 includes a lip 160 that engages first split sleeve member 128 and second split sleeve member 130. As such, when actuated by displacement of poppet valve 114, split sleeve guide member 126 forces first split sleeve member 128 and second split sleeve member 130 to translate in first direction 158 (i.e., the pair of split sleeve members are dependently translatable with split sleeve guide member 126 when translating in first direction 158). Forcing first split sleeve member 128 and second split sleeve member 130 to translate in first direction 158 causes rotation of the first and second drive cranks 136, 138 coupled to the first and second drive cranks 136, 138, and results in actuation of first hook linkage 132 and second hook linkage 134, thereby inducing actuation of first hook member 120 and second hook member 122 (both shown in FIG. 2) from a closed position to an open position and releasing a store from store ejector rack 116.

In addition, split sleeve guide member 126 and the pair of split sleeve members are translatable in second direction 162 when loading the store into store ejector rack 116. In the exemplary implementation, the pair of split sleeve members are independently translatable relative to split sleeve guide member 126 when translating in second direction 162. As a result, first hook member 120 and second hook member 122 are likewise independently positional from an open position to a closed position. As such, a store may be loaded into store ejector rack 116 in a more simplified and flexible manner.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A store ejector rack comprising:
   a first hook member and a second hook member;
   a split sleeve guide member;
   a pair of split sleeve members, comprising a first split sleeve member and a second split sleeve member, disposed around and operatively coupled to said split sleeve guide member, said first split sleeve member coupled to a first hook linkage actuating said first hook member and said second split sleeve member coupled to a second hook linkage actuating said second hook member; and
   a valve control assembly operatively coupled to and actuated by linear translation of said split sleeve guide member, wherein actuation via linear translation of said split sleeve guide member causes actuation of said first hook member, said second hook member, and said valve control assembly.

2. The store ejector rack in accordance with claim 1, wherein said split sleeve guide member and said pair of split sleeve members are selectively translatable in a first direction and a second direction, said pair of split sleeve members dependently translatable with said split sleeve guide member when translating in the first direction, and independently translatable relative to said split sleeve guide member when translating in the second direction.

3. The store ejector rack in accordance with claim 1, wherein said pair of split sleeve members are positioned about said split sleeve guide member such that a gap is defined therebetween, said split sleeve guide member operatively coupled to said valve control assembly through said gap.

4. The store ejector rack in accordance with claim 1, wherein said split sleeve guide member and said valve control assembly are operatively coupled together at a geared interface.

5. The store ejector rack in accordance with claim 4, wherein said split sleeve guide member comprises a rack gear, and wherein said valve control assembly comprises a release shaft comprising a pinion gear operatively engaged with said rack gear.

6. The store ejector rack in accordance with claim 5, wherein said release shaft further comprises a cam surface, said valve control assembly further comprising a valve control member coupled to said cam surface, said valve control member configured to induce actuation of an isolation valve as a function of rotation of said release shaft.

7. The store ejector rack in accordance with claim 1 further comprising a safety shaft configured to selectively engage said pair of split sleeve members simultaneously, said safety shaft configured to restrict actuation of said pair of split sleeve members when engaged therewith.

8. The store ejector rack in accordance with claim 1 further comprising a linkage assembly comprising a first hook linkage coupled between said first hook member and said first split sleeve member, and a second hook linkage coupled between said second hook member and said second split sleeve member.

9. The store ejector rack in accordance with claim 8 further comprising a first drive crank coupled between said first hook linkage and said first split sleeve member, and a second drive crank coupled between said second hook linkage and said second split sleeve member, each of said first drive crank and said second drive crank rotatable about a fixed pivot point.

10. A store ejection system comprising:
 a fluid source;
 an actuation system comprising:
  an accumulator in selective fluid communication with said fluid source; and
  a poppet valve configured to control a flow of fluid channeled from said accumulator;
 a split sleeve guide member actuatable via displacement by said poppet valve;
 a pair of split sleeve members, comprising a first split sleeve member and a second split sleeve member, disposed around and operatively coupled to said split sleeve guide member, wherein said pair of split sleeve members are positioned about said split sleeve guide member such that a gap is defined therebetween;
 an isolation valve configured to control a flow of fluid channeled from said fluid source to said accumulator; and
 a valve control assembly operatively coupled to said isolation valve, and operatively coupled to and actuated by linear translation of said split sleeve guide member through said gap, wherein actuation of said split sleeve guide member causes actuation of said valve control assembly and said isolation valve.

11. The store ejection system in accordance with claim 10, wherein said split sleeve guide member and said pair of split sleeve members are selectively translatable in a first direction and a second direction, said pair of split sleeve members dependently translatable with said split sleeve guide member when translating in the first direction, and independently translatable relative to said split sleeve guide member when translating in the second direction.

12. The store ejection system in accordance with claim 10, wherein said split sleeve guide member and said valve control assembly are operatively coupled together at a geared interface.

13. The store ejection system in accordance with claim 12, wherein said split sleeve guide member comprises a rack gear, and wherein said valve control assembly comprises a release shaft comprising a pinion gear operatively engaged with said rack gear.

14. The store ejection system in accordance with claim 13, wherein said release shaft further comprises a cam surface, said valve control assembly further comprising a valve control member coupled to said cam surface, said valve control member configured to induce actuation of an isolation valve as a function of rotation of said release shaft.

15. The store ejection system in accordance with claim 10 further comprising a safety shaft configured to selectively engage said pair of split sleeve members simultaneously, said safety shaft configured to restrict actuation of said pair of split sleeve members when engaged therewith.

16. The store ejection system in accordance with claim 15, wherein said safety shaft is rotatable for selectively engaging said pair of split sleeve members simultaneously.

17. A method of discharging a store from a vehicle, said method comprising:
 releasably retaining a store within a store ejector rack with a first hook member and a second hook member;
 providing fluid from a fluid source to an accumulator via an isolation valve;
 actuating a poppet valve in flow communication with the accumulator;
 actuating a split sleeve guide member based on actuation via displacement of the poppet valve, the split sleeve guide member having a pair of split sleeve members, including a first split sleeve member and a second split sleeve member, disposed around and operatively coupled thereto, wherein the pair of split sleeve members are positioned about the split sleeve guide member such that a gap is defined therebetween; and
 actuating a valve control assembly based on actuation via linear displacement of the split sleeve guide member, the valve control assembly operatively coupled to the split sleeve guide member through the gap, and operatively coupled to the isolation valve such that actuation of the split sleeve guide member causes actuation of the isolation valve.

18. The method in accordance with claim 17, wherein the first split sleeve member is coupled to a first hook linkage actuating the first hook member and the second split sleeve member is coupled to a second hook linkage actuating the second hook member, said method further comprising:
 actuating the pair of split sleeve members based on actuation via displacement of the split sleeve guide member along a first axis, to cause linear translation of the first hook linkage and second hook linkage along a second axis oriented substantially normal to the first axis; and
 actuating the first hook member and the second hook member based on actuation of the pair of split sleeve members and first hook linkage and second hook linkage, wherein the first hook member and the second hook member are configured to release the store when actuated.

19. The method in accordance with claim 18, wherein the pair of split sleeve members are dependently translatable with the split sleeve guide member when translating in a first direction, wherein actuating the pair of split sleeve members comprises translating the split sleeve guide member in the first direction.

20. The method in accordance with claim 18 further comprising selectively restricting actuation of the pair of split sleeve members with a safety shaft configured to selectively engage the pair of split sleeve members simultaneously.

* * * * *